US012774644B2

(12) United States Patent
Thatathil et al.

(10) Patent No.: US 12,774,644 B2
(45) Date of Patent: Oct. 27, 2026

(54) CHEMICAL RESISTANT ELASTOMERIC SEAL HAVING TWO ELASTOMERS

(71) Applicant: Halliburton Energy Services, Inc., Houston, TX (US)

(72) Inventors: Sandeep Thatathil, Singapore (SG); Chad W. Glaesman, Singapore (SG); Somen Kumar Bhudolia, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 41 days.

(21) Appl. No.: 18/501,400

(22) Filed: Nov. 3, 2023

(65) Prior Publication Data

US 2025/0146374 A1 May 8, 2025

(51) Int. Cl.
*E21B 23/06* (2006.01)
*C08K 7/02* (2006.01)

(52) U.S. Cl.
CPC ................ *E21B 23/06* (2013.01); *C08K 7/02* (2013.01)

(58) Field of Classification Search
CPC ....... E21B 23/06; E21B 33/1208; C08K 7/02; F16J 15/022
USPC .......................................................... 277/651
See application file for complete search history.

(56) References Cited

U.S. PATENT DOCUMENTS 2,360,734 A * 10/1944 Smith .................. F16J 15/3284 220/378
2,597,976 A * 5/1952 Cousins ............... F16J 15/3284 277/944
3,357,679 A 12/1967 Gulick
3,788,654 A * 1/1974 Mandley .................. F16J 15/32 277/944
4,040,636 A * 8/1977 Albertson .............. F16J 15/166 277/572
4,305,595 A * 12/1981 Miyagishima ....... F16J 15/3284 277/944
7,143,832 B2 * 12/2006 Freyer ................... E21B 43/103 166/387
9,835,252 B2 12/2017 Kocurek
11,598,168 B2 3/2023 Pelto et al.
2005/0109502 A1 * 5/2005 Buc Slay ............... B82Y 30/00 166/179
2009/0283279 A1 * 11/2009 Patel ..................... E21B 33/129 166/382
2010/0018778 A1 1/2010 Nanayakkara
2010/0139929 A1 6/2010 Rytlewski et al.
(Continued)

OTHER PUBLICATIONS

International Search Report and Written Opinion for International Patent Application No. PCT/US2023/080996 dated Jul. 26, 2024. PDF file. 11 pages.

(Continued)

*Primary Examiner* — Tara Schimpf
(74) *Attorney, Agent, or Firm* — Scott Richardson; C. Tumey Law Group PLLC

(57) ABSTRACT

A variety of methods and apparatus are disclosed, including for a wellbore, in one embodiment, a downhole tool having an elastomeric component including an inside portion comprising a first elastomer and an outside portion comprising a second elastomer different than the first elastomer, wherein the outside portion encloses the inside portion, and wherein the second elastomer is more chemically resistant than the first elastomer to fluids in the wellbore.

20 Claims, 7 Drawing Sheets

(56) References Cited

U.S. PATENT DOCUMENTS

| | | | | |
|---|---|---|---|---|
| 2010/0194049 | A1* | 8/2010 | Kocurek | F16J 15/104 277/627 |
| 2011/0210521 | A1 | 9/2011 | Warren et al. | |
| 2014/0060811 | A1 | 3/2014 | Mazyar et al. | |
| 2014/0060815 | A1* | 3/2014 | Wang | E21B 33/1208 166/179 |
| 2015/0226047 | A1 | 8/2015 | Robb et al. | |
| 2016/0076307 | A1 | 3/2016 | Harrington et al. | |
| 2016/0237754 | A1 | 8/2016 | Sui | |
| 2018/0100582 | A1* | 4/2018 | Li | F16J 15/102 |

OTHER PUBLICATIONS

Green Tweed, LF10 PTFE type coating, Nov. 17 2022.

Netherlands Search Report and Written Opinion for NL Patent Application No. 2038600 dated Mar. 5, 2025. English Machine Translation with Original Untranslated Version, PDF file. 12 pages.

* cited by examiner

CHEMICAL RESISTANT ELASTOMERIC SEAL HAVING TWO ELASTOMERS

BACKGROUND

Boreholes (wellbores) may be drilled into subterranean formations to recover valuable hydrocarbons, among other functions. Operations may be performed before, during, and after the borehole has been drilled to produce and continue the flow of the hydrocarbon fluids from the subterranean formation through the borehole to the surface. Downhole tools in the borehole or wellbore may facilitate the production of the hydrocarbon fluids from the subterranean formation.

A typical operation of downhole applications may be to apply a seal within a borehole. A seal may isolate and contain produced hydrocarbons and pressures within the borehole. Different tools and equipment may be utilized to create seals, for example, between the outside of a production tubing string and the inside of a casing string, a liner, or the borehole wall. Exposure of the seal to borehole chemicals may induce failure of the seal and result in loss of time, money, and equipment.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1A:
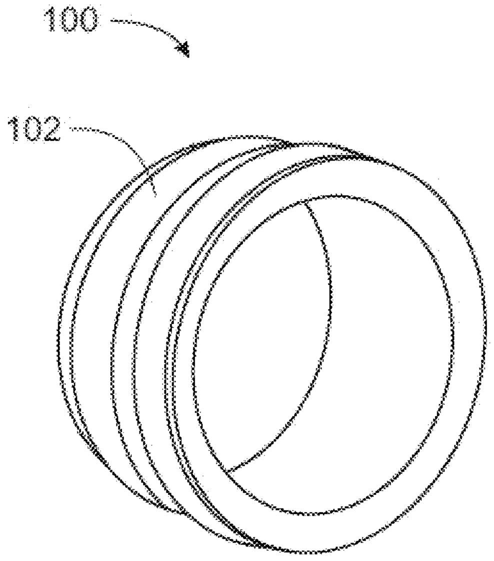
FIG. 1A is a diagram of a sealing element for a packer.

Aspects of the present disclosure include a downhole tool having an elastomeric component such as a chemical resistant elastomeric seal comprising two co-cured elastomers.

Disclosed herein are downhole tools having a sealing element including two elastomers in which one elastomer (e.g., a more chemically resistant elastomer) encapsulates the other elastomer (e.g., a less chemically resistant elastomer). Encapsulation of the base polymer (elastomer) with a more chemically resistant polymer (elastomer) can reduce adverse effect of downhole environmental exposure on the sealing element. Aspects are directed to a sealing element having [1] an elastomeric inner core (a first elastomer) and [2] an elastomeric outer cover (a second elastomer) that reduces (protects against) chemical effects of downhole fluids.

Embodiments herein include seals having a dual elastomer configuration to reduce degradation of the seal by the environment. Implementations can be characterized as a hybrid seal design for improved (increased) chemical resistance and gas resistance.

Elastomer selection for materials in the oil and gas industry is facing an increasing challenge as new applications often include conditions of increasing environmental severity in both temperatures and chemical exposure. Chemical incompatibly can be a contributor to premature seal failure. Unfortunately, changing seal material to more chemically resistant elastomers can generally include a significant price penalty along with performance tradeoffs in areas such as extrusion resistance and low temperature sealing performance.

In response, embodiments herein utilize a multi-layered (dual layered) construction that is a base elastomer (inner layer or inside portion) having an integrated covering (outer layer or outside portion) that is an elastomer (a protective elastomer). The covering encloses the base elastomer. The cover (outer layer) is a chemically resistant elastomeric material to improve (increase) the overall chemical resistance without significantly adversely impacting other performance metrics. This dual-layer construction is generally without significantly increasing cost or is less cost than utilizing only the chemically resistant elastomeric material as a sole elastomer of the seal.

In examples of the dual layer seal, the elastomer cover or coating can be an outer layer that is more chemically resistant to downhole conditions than is the bulk of the seal. The bulk (majority) of the seal or sealing element can be the core (inside core or inner layer) that is less chemically resistant but beneficially costs less in implementations and generally not as susceptible to performance tradeoffs with respect to extrusion resistance and low temperature.

Chemically resistant may generally include chemical compatibility. This can include resistance to chemical attack, such as resistance to chemical corrosion and resistance to swelling (e.g., swelling due to physical absorption of the chemical), as well as resistance to diffusion by the chemical, and so on.

Elastomers for the core include, for example, are nitrile butadiene rubber (NBR) (also known as nitril rubber), hydrogenated nitrile butadiene rubber (HNBR), fluorine kautschuk material (FKM) (also known as fluorine rubber or fluoro-rubber), tetrafluoroethylene propylene (FEPM or the tradename AFLAS®) (a partially fluorinated polymer that is a copolymer of tetrafluoroethylene and propylene), and epichlorohydrin rubber (ECO), and so on Other elastomers are applicable for the core. Elastomers for the outer layer include, for example, NBR, HNBR, FKM, FEPM, and perfluoroelastomer (FFKM) (higher amounts of fluorine than standard FKM), and so forth. Other elastomers are applicable for the outer layer. A wide variety of elastomer selections for the specified combination of the core and the outer layer can be applicable. Example combinations include utilizing NBR or FKM rubber as the inner core and FEPM or FFKM as the outer layer, and so forth. FEPM or FFKM have greater resistance to gas diffusion and thus can be beneficial as the outer layer, for example, for a high hydrogen sulfide ($H_2S$) concentration environment. Other example combinations are applicable for the same or other reasons. Factors for consideration include, for instance, the downhole environment, the application, cost, etc.

The core and/or the outer layer can include filler material (e.g., reinforcement material) along with the respective elastomer. The filler can be particles or fibers, or both. The fibers can be short fibers, long fibers, and/or woven fibers. The filler material may be, for example, carbon black, silica particles (silicon dioxide or $SO_2$), cotton fibers, rayon fibers, aramid fibers (e.g., Kevlar®), etc.

Embodiments give a sealing system design with two different layers of elastomers. The two layers are (1) an outer layer and (2) a center core. The outer layer encloses the center core. In implementations, both of these elastomers can be co-cured and/or bonded together making the product (the two layers of different respective elastomers as a seal or sealing element) respond mechanically generally as a single material. The outer elastomer layer thickness can be specified based on, for example, the product geometry and performance requirements. In implementations, the outer layer has a thickness (wall thickness) of at least 0.5 millimeters (mm), such as in the ranges of 0.5 mm to 2 mm, 0.5 mm to 5 mm, 0.5 mm to 8 mm (or greater), 0.8 mm to 8 mm (or greater), 1 mm to 8 mm (or greater), etc. This is in contrast with conventional coatings on elastomers, which are typically less than 0.5 mm. Again, the thickness of the present outer layer is at least 0.5 mm in implementations. The maximum thickness to specify can be considered open, for example, based on the construction of the particular part or other factors.

Embodiments of the present seal technique (e.g., dual elastomer) can be employed for elastomeric products (e.g., O-rings, molded seals, sealing elements, etc.) for downhole tools. Molded seals can include engineered (custom) molded seals and bonded seals. The new seal technique can be utilized for elastomeric sealing elements for a packer (e.g., production packer, test packer, isolation packer, etc.), a plug (e.g., bridge plug, frac plug, inflow control device [ICD] plug, etc.), a liner hanger (e.g., expandable liner hangers), a rotating control device (RCD), and so on.

A focus can be to avoid exposure of inner core material of the O-ring or sealing element to a harsh corrosive environment or to an environment chemically incompatible with the inner core. The outer elastomer layer that reduces or prevents such exposure to the elastomer core can be applied through extrusion (e.g., co-extrusion) or through wrapping, or other relevant techniques, in making the O-ring or sealing element. Moreover, along with chemical compatibility factors, the design and construction of the seal can consider (1) a high temperature resistant outer layer for environments with high temperature application including for short term application, (2) the seal outer elastomer layer with low glass transition temperature (Tg) improving low temperature sealing performance, and (3) gas diffusion and liquid diffusion, and so forth.

Table 1 below gives chemical compatibility of different elastomers with respect to different chemicals and materials. The terms “poor,” “moderate,” and “good” are given, as would be understood by one of ordinary skill in the art. Good chemical compatibility (good chemical resistance) is more chemical resistance than moderate chemical compatibility (moderate chemical resistance). Moderate chemical compatibility is more chemical resistance than poor chemical compatibility (poor chemical resistance). The five elastomers (top row) given in Table 1 are nitrile butadiene rubber (NBR) (also known as nitril rubber), hydrogenated nitrile butadiene rubber (HNBR), fluorine kautschuk material (FKM) (also known as fluorine rubber or fluoro-rubber), tetrafluoroethylene propylene (FEPM or the tradename AFLAS®) (a partially fluorinated polymer that is a copolymer of tetrafluoroethylene and propylene), and perfluoroelastomer (FFKM) (higher amounts of fluorine than standard FKM). The materials considered for chemical compatibility (chemical resistance) by the elastomers are given in the far-left column of Table 1. The evaluation of chemical compatibility generally considers any swelling of the elastomer and other degradation of the elastomer by the chemicals (materials). As can be seen in Table 1, FFKM has good chemical compatibility for all of the considered. However, FFKM is relatively expensive at great cost compared to the other elastomers in Table 1. Therefore, FFKM can be a good candidate for the outer layer in implementations.

The chemical compatibility evaluation may consider the permeability coefficient of the elastomer with respect to the chemical or gas diffusion, and in which a lower permeability coefficient is desirable (good). The permeability coefficient can be measured, for example, per American Society for Testing and Materials (ASTM) standard D1418-22 “Standard Practice for Rubber and Rubber Latices—Nomenclature” (last updated Jun. 15, 2022) of ASTM international. The determination of permeability can be per International Organization for Standardization (ISO) 2782-1 or ISO 2782-2. The standard ISO 23936-2 can be referenced for long term aging and life prediction.

A related consideration can be the storage modulus (E') change of the elastomer due to gas diffusion. Table 2 gives examples of E' change in percent (%) for gas-exposed samples of elastomer. The gas is hydrogen gas. The samples tested were exposed to hydrogen pilot well and measured, and the modulus made at tension. The E' was measured in units of megapascals (MPa), but as indicated, the unit of the change in Table 2 is %. The change is from the original modulus before the elastomer being exposed to the gas.

TABLE 1

Chemical Compatibility of Different Elastomers

| | NBR | HNBR | FKM | FEPM | FFKM |
|---|---|---|---|---|---|
| $H_2S$ | Poor | Moderate | Moderate | Good | Good |
| Sweet Crude | Good | Good | Good | Good | Good |
| Diesel | Moderate | Moderate | Good | Poor | Good |
| Aromatic hydrocarbons | Poor | Poor | Good | Poor | Good |
| Oil-Based Muds/Fluids | Poor | Moderate | Good | Moderate | Good |
| Ester-based drilling mud | Moderate | Moderate | Moderate | Moderate | Good |
| Amine/Oil Inhibitors | Moderate | Good | Poor | Good | Good |
| Water based inhibitors | Good | Good | Moderate | Good | Good |
| Steam | Poor | Poor | Moderate | Moderate | Good |
| Chlorides | Good | Good | Good | Good | Good |
| Bromides | Poor | Moderate | Good | Good | Good |
| Formates | Good | Good | Poor | Good | Good |
| High pH fluids (pH >9) | Moderate | Good | Poor | Good | Good |
| Alcohols | Good | Good | Moderate | Good | Good |
| Acids | Moderate | Moderate | Good | Good | Good |

TABLE 2

Storage Modulus Recovery of Different Elastomers Exposed to Gas

| | Storage Modulus Change | |
|---|---|---|
| Material Type | E'—After 30 days | E'—After 60 days |
| HNBR | −21.9 | −0.5 |
| FKM | −28.8 | −19.3 |
| FFKM | −20.1 | −11.8 |
| FEPM | −4.6 | 0 |

The chemical resistance and diffusion of chemicals through the elastomeric matrix may be driven by elastomer types and is generally dependent on the polymer architecture that drives properties like polarity, crystallinity, etc. The gas permeability coefficient may be relevant with respect to evaluation of the downhole environmental resistance of a given elastomer. As discussed with respect to Table 2, the change in the elastomer storage modulus due to exposure to gas (and thus the elastomer experiencing gas diffusion) can be considered.

Embodiments herein may give products (elastomeric components in downhole tools) with improved (increased) environmental resistance without a significant cost impact or with a relatively modest increase in cost of the sealing element. Embodiments of the present techniques can give a sealing element or O-ring with increased environmental resistance without excessive cost increase.

FIG. 1A is a sealing element 100 for a downhole tool that is a packer. The sealing element 100 has a dual elastomer construction, as discussed. In particular, the sealing element 100 has an outer (outside) layer 102 (a first elastomer) that encloses (e.g., completely encloses) an inner core (a second elastomer). In implementations, the first elastomer that is outer layer 102 is more chemically resistant than the second elastomer that is the inner core (not shown). Thus, the outer layer 102 protects the inner core (104 of FIG. 1B) from chemical degradation by the downhole environment.

Figure 1B:
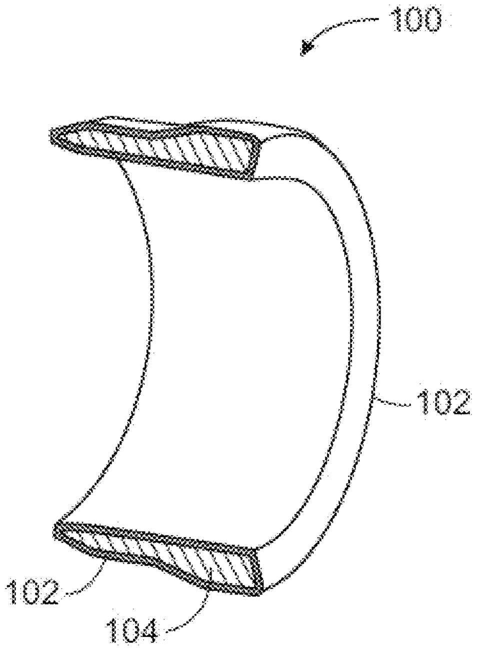
FIG. 1B is the sealing element of FIG. 1A, but with the sealing element cut as a cross section to reveal the inner core of the sealing element.

FIG. 1B is the sealing element 100 of FIG. 1A, but with the sealing element 100 cut as a cross section to reveal the inner core 104 for illustration. As indicated in the depiction, the inner core 104 is the bulk (majority) of the sealing element 100. The outer layer 102 may be characterized as a cover in implementations. In embodiments, the outer layer is at least 0.5 mm thick.

In examples, the outer layer 102 may be fabricated (manufactured, applied) through extrusion (e.g., co-extrusion with the inner core 104), or the outer layer 102 may be applied by wrapping the outer layer 102 around the inner core 104. The wrapping may give and maintain the specified thickness of the outer layer 102 during fabrication. Other manufacturing techniques are applicable.

The inner core 104 (inside portion, inner layer) may be, for example, NBR, HNBR, FKM, FEPM, or ECO, etc. The outer layer 102 (outside portion) may be, for example, NBR, HNBR, FKM, FEPM, or FFKM, etc. The inner core 104 and/or outer layer can include filler material in the respective elastomer. The filler material can be long, short, and/or woven fibers. The filler material can be particulate fillers.

Figure 2:
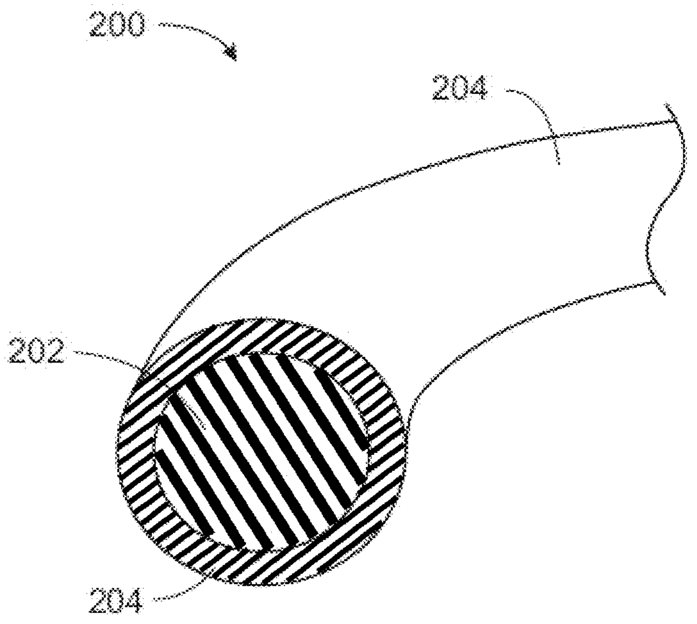
FIG. 2 is a diagram of a cross section of an O-ring.

FIG. 2 is a portion of an O-ring 200. The O-ring 200 is depicted cut for illustration as a cross section so to reveal the inner core 202 of the O-ring 200. The O-ring 200 is for a downhole tool. The inner core 202 is a first elastomer that is enclosed (e.g., fully enclosed) by an outer layer 104 (a second elastomer) of the O-ring 200. The second elastomer is different than the first elastomer. The O-ring 200 has the discussed dual elastomer design. For instance, the outer layer 204 can be a cover that protects the inner core 202 from downhole environmental degradation. In embodiments, the outer layer 204 is at least 5 mm. In implementations, the inner core 102 is the bulk (majority) of the O-ring 200. The inner core 104 and/or outer layer 102 can include filler material.

Embodiments of the present elastomeric component (as an elastomer seal—an O-ring, sealing element, molded seal, etc.) for a downhole tool can include two layers of elastomer. One layer or portion is an internal core material (e.g., a common elastomer type). The other layer of elastomer is an outer elastomer layer specially designed to help to improve the environmental compatibility of the elastomeric component. Both layers can be co-cured together so that they function generally as a single uniform unit. Similar cure system types (e.g., crosslinkers, cure temperature, etc.) may be used for each layer to promote co-curing to reduce any risk of delamination. Bonding agents, either as additives incorporated into the elastomer compounds or as surface applied to the elastomer compounds in manufacturing, can improve (increase) the adhesion and consolidation between the two dissimilar elastomer types.

The two-layer design (inner elastomer core and outer elastomer layer being different respective elastomers) can help to develop seals with the thin outside layer that offers some additional resistance to direct chemical environmental exposures. The outer layer (e.g., more expensive elastomer) being relatively thin can reduce the cost impact (increase) of utilizing more expensive elastomers. Thus, beneficially, two-layer construction gives increased chemical resistance without excessive cost increase. In the two-layer elastomeric component for the downhole tool, most of (the majority of) the elastomeric component can be the inner core, which can have less chemical resistance and thus be a more common type of elastomer that typically less expensive than the elastomer of the outer layer. Moreover, for chemicals or gases diffusing through the outer protective layer, with the potential to age the core material, the outer material at the sealing interfaces may remain elastic and offer improved (increased) sealing compared the elastomeric component (seal) having the core material only.

Embodiments improve (increase) long-term chemical resistance of seals by using a higher performing elastomer as an outer layer barrier. Short-term resistance to corrosive fluids is generally also improved (increased), including such as in service intervention activities of the wellbore. This outer barrier layer can also reduce the gas permeation and therefore reduce the chemical impact of reactive gases by providing a lower gas permeable member. Chemically stable materials (elastomers) as a cover, coating, or surface treatment remains elastic making the sealing performance less sensitive to the aging characteristics of the bulk material (core elastomer).

The inner core (first elastomer) being more than the outer layer (second elastomer) can mean that the inner core (first elastomer) is a majority (greater than 50% by weight or volume) of the elastomeric component having the dual elastomer construction. In implementations, the inner core (first elastomer) as the inside portion or inside core can be in a range of 51% to 95% by weight of the elastomeric component for the downhole tool.

In alternatives, thermoplastic chemically resistant coatings [e.g., polytetrafluoroethylene (PTFE), etc.] may be a substitute for the elastomer outer layer or additionally included on the elastomer outer layer.

Figure 3:
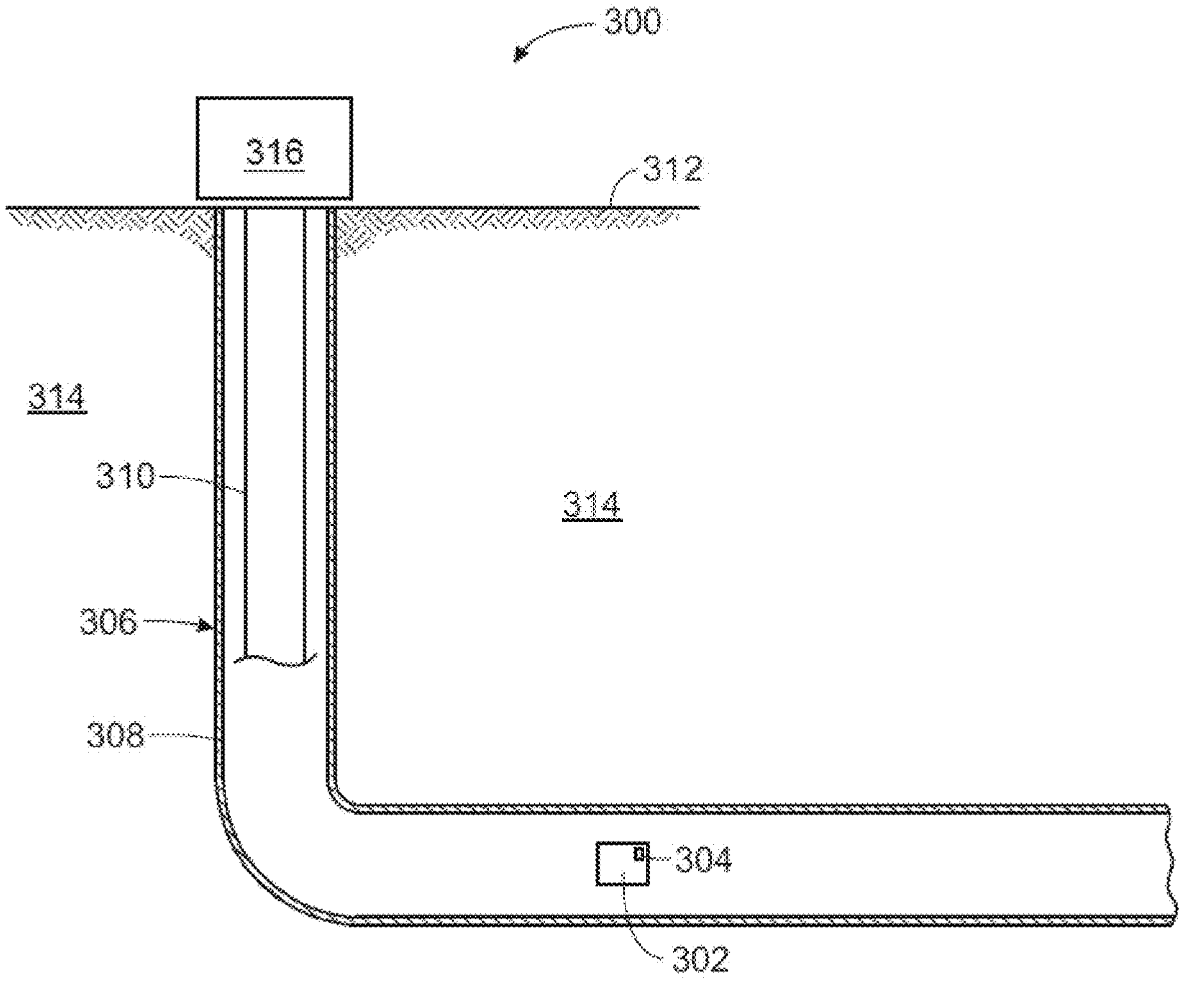
FIG. 3 is a diagram of a well site employing a downhole tool having an elastomeric component.

FIG. 3 is a well site 300 employing a downhole tool 302 having an elastomeric component 304 that has a dual elastomer construction, as discussed. The downhole tool 302 is depicted as the simplified representation of a square for clarity. The downhole tool 302 is deployed in a wellbore 306.

The elastomeric component 304 includes an inner core (first elastomer) encapsulated by a protective outer layer (second elastomer). The second elastomer is generally more chemically resistant to (more chemically compatible with) downhole fluid in the wellbore 306 than is the first elastomer. The second elastomer may be less susceptible to swelling or other degradation caused by wellbore fluids.

The elastomeric component 304 may be a sealing element, an O-ring, a molded seal, etc., of the downhole tool 302. A sealing element as the elastomeric component 304 may be utilized via the downhole tool 302 in operation, for example, to form a seal between the downhole tool 302 and an adjacent surface, such as a wellbore casing or liner. Other types of sealing elements are applicable. An O-ring and/or molded seal can be considered a sealing element.

The downhole tool 302 may be, for example, a packer (e.g., production packer, test packer, isolation packer, etc.), a plug (e.g., bridge plug, frac plug, ICD plug, etc.), a liner hanger (e.g., expandable liner hanger), a rotating control device (RCD), a valve, and the like. A valve as the downhole tool 302 (or as a part of a downhole tool 302) may include an elastomeric component 304, for example, as a molded seal or O-ring.

The downhole tool 302 as installed in the wellbore 306 may be set permanently or set as retrievable. The downhole tool 302 may be mechanically set or hydraulically set.

When set, the downhole tool 302 if a packer or plug with the elastomeric component 304 as a sealing element may fluidically isolate the lower part of the wellbore 306 (downhole of the packer or plug) from an upper part of the wellbore 306 (uphole of the packer or plug). When set, the downhole tool 302 as a packer may isolate zones of the annulus between the depicted casing 308 and production tubing 310 (e.g., a tubing string) by providing a seal (fluid seal) via the elastomeric component between the production tubing 310 and the casing 308. In examples, a packer if the downhole tool 302 may be disposed on the production tubing 310.

For an example of the downhole tool 302 as a liner hanger, the liner hanger may be deployed to mechanically support an upper end of a liner from the lower end of a previously installed casing. Additionally, liner hangers may be used to seal the liner to the casing 308, such as via the elastomeric component 304 as a sealing element. Once an upper portion of the wellbore 306 has been drilled and cased, it may be desirable to continue drilling and to line a lower portion of the wellbore 306 with a liner lowered through the upper cased portion thereof. For the annulus between the liner hanger (e.g., expandable liner hanger) and the wellbore casing 308, the fluid seal may provide that in the annulus, uphole of the expandable liner hanger is fluidically sealed from downhole of the expandable liner hanger. The expandable liner hanger via the elastomeric component may create (provide) a hydraulic seal (fluid seal) between the expandable liner hanger and the wellbore casing 308.

The wellbore 306 is formed through the Earth surface 312 into a subterranean formation 314 in the Earth crust. In the illustrated implementation, the wellbore 306 has the casing 308 and is therefore a cased wellbore. Cement (not shown) may be disposed between the casing 308 and the formation 314 face. The formation 314 face can be considered a wall of the wellbore 306.

Perforations may be formed through the casing 308 (and cement) for entry of fluid (e.g., hydrocarbon, water, etc.) from the subterranean formation 314 into the wellbore 306 to be produced (routed) as produced fluid through the production tubing 310 to the surface 312. The surface equipment 316 situated at or near the wellbore 306 may include a wellhead for receipt of the produced fluid. In other implementations, the wellbore 306 can be utilized for injection of fluid from the surface 312 through the wellbore 306 and the perforations in the casing 308 (and cement) into the subterranean formation 314.

The surface equipment 316 can include a hoisting apparatus (e.g., for raising and lowering pipe strings) and a derrick. The surface equipment 316 and equipment deployed in the wellbore 306 can include a wireline, slickline, coiled tubing, tubing string, pipe, drill pipe, drill string, and the like, that facilitates mechanical conveyance for deploying downhole tools (e.g., downhole tool 302 and other tools). The deployment of the downhole tool 302 may include lowering the downhole tool 302 into the wellbore 306 from the surface 312 and setting (e.g., via mechanical slips or other mechanisms) the downhole tool 302 in the wellbore 306. In some implementations, the equipment (e.g., wireline) may provide electrical connectivity, for example, to actuate the downhole tool 302. For example, a packer or plug may be actuated to seal off a portion of the wellbore 306.

Again, the casing 308 may be secured within wellbore 306 by cement (not shown). The casing 308 may be, for example, metal, plastic, composites, and the like, and may be expanded or unexpanded as part of an installation procedure.

The production tubing 310 may be a tubing string utilized in the production of hydrocarbons. The downhole tool 302 may be disposed on or near production tubing 310 in certain implementations.

As mentioned, the downhole tool 302 as a plug (e.g., frac plug, bridge plug, etc.) having the elastomeric component 304 as a sealing element with the dual elastomer configuration may be set to isolate a lower part of the wellbore 306. The bridge plug may be installed to permanently seal the wellbore 306 or installed temporarily to perform work on or via the wellbore 306. Bridge plugs are downhole tools that can be located in the wellbore 306 and set to isolate the lower part of the wellbore 306 (further downhole). The bridge plug is generally run in hole and set to isolate a lower zone of the wellbore 306 from an upper zone of the wellbore 306. Bridge plugs may be permanent or retrievable, facilitating the lower wellbore to be permanently sealed from production or temporarily isolated from a treatment conducted on an upper zone of the wellbore 306.

A bridge plug can include slips (e.g., mechanical slips), a mandrel, and sealing element (e.g., expandable, elastomer, rubber, etc.). Again, the elastomeric component 302 of the downhole tool as a bridge plug can be the sealing element having a dual elastomer construction previously discussed. A bridge plug may be run (e.g., run on a wireline or pipes, and/or through a tubing string) and set (e.g., set in casing 308 or tubing 310) to isolate a lower zone of the wellbore 306 while an upper section of the wellbore 306 is tested, cemented, stimulated (e.g., hydraulically fracturing of the subterranean formation 314), produced (e.g., hydrocarbon and/or water produced from the subterranean formation 314 through the wellbore 306), or injected (injection from surface 312 through the wellbore 306 into the subterranean formation 314). The bridge plug may isolate the upper zone from the lower zone, preventing or reducing fluids of the lower zone (downhole of the plug) from reaching an upper zone (uphole of the plug) of the wellbore 306. Again, such isolation may exist while the upper zone (section) is tested, cemented, stimulated, produced, or injected either permanently or temporarily within the wellbore 306.

The downhole tool 302 as a packer may be a device that can be run into the wellbore 306 with a smaller initial outside diameter that then expands externally to seal the wellbore 306. Packers may employ flexible, elastomeric elements (e.g., the elastomeric component 302) that expand. A packer may be a production packer, test packer, isolation packer, etc. A production packer may isolate the annulus (e.g., between the production tubing 310 and the casing wellbore 102 wall) and anchor or secure the bottom of the production tubing string. A retrievable packer may be a type of packer that is run and retrieved on a running string or production string, unlike a permanent production packer that is set in the casing or liner before the production string is run. A typical packer assembly secures the packer against the casing 104 or liner wall, such as by a slip arrangement of the packer, and creates (forms) a hydraulic seal via sealing elements (e.g., elastomeric component 302 as an expandable elastomeric element) of the packer to isolate the annulus. Packers are typically classified by application, setting method and possible retrievability.

Applicable wellbores for the downhole tool 302 and its elastomeric component 304 include vertical wellbores, horizontal wellbores, deviated wellbores, multilateral wells, and the like. It should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well. Also, even though FIG. 3 depicts an onshore operation, it should be understood by those skilled in the art that the present techniques are applicable for offshore operations. In addition, while FIG. 3 depicts use of the downhole tool 302 in a cased portion of wellbore 306, it should be understood that a downhole tool 302 may also be used in uncased portions (e.g., openhole portions) of wellbore 306.

An embodiment is a method of deploying a downhole tool (e.g., a packer, a plug, a liner hanger, etc.) into a wellbore. The method includes lowering the downhole tool into the wellbore and positioning the downhole tool at a target location (e.g., depth) in the wellbore. The downhole tool has an elastomeric component having an inside core comprising a first elastomer and an outside layer comprising a second elastomer different than the first elastomer. The outside layer encloses the inside core. The second elastomer is more chemically resistant than the first elastomer to fluids in the wellbore. The elastomeric component has more of the first elastomer than the second elastomer (e.g., by weight or volume). In implementations, the outside layer (second elastomer) has a thickness of at least 0.5 mm, such as in the range of 5 mm to 2 mm. In implementations, the elastomeric component is an O-ring or a molded seal. In implementations, the elastomeric component is a sealing element. In those implementations, the method includes forming, via the sealing element, a seal (fluidic seal, hydraulic seal) between the downhole tool and a surface (e.g., a casing, a liner, a wellbore wall, etc.).

Figure 4A:
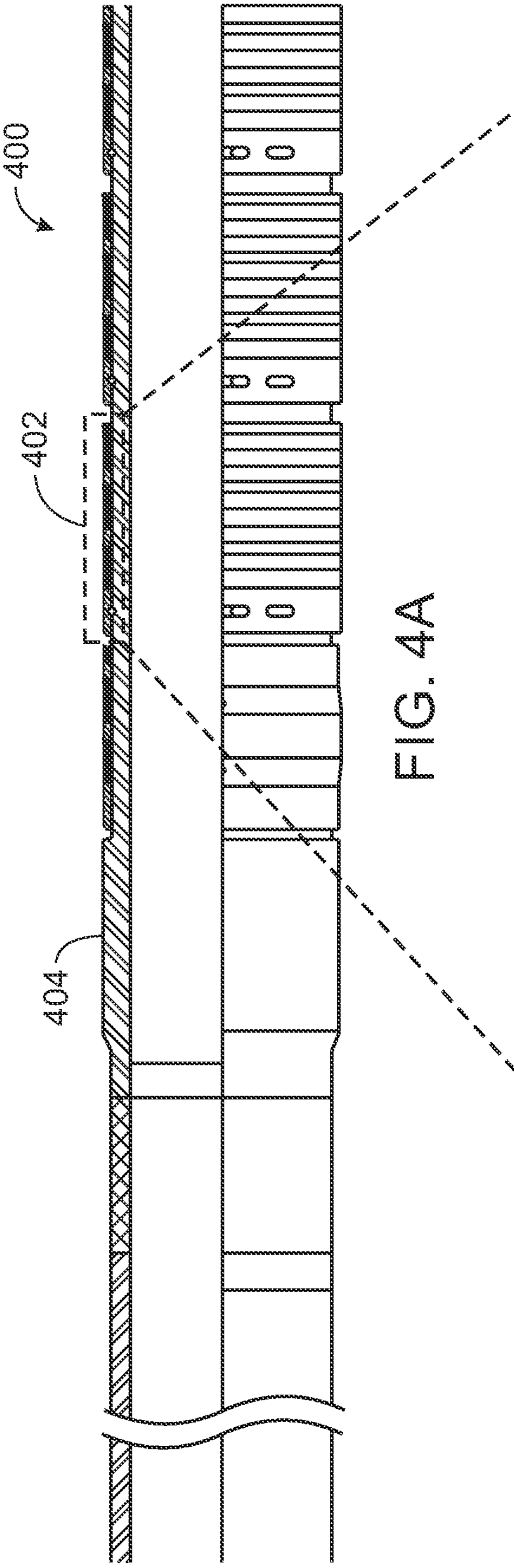
FIG. 4A is a diagram of downhole tool for a wellbore.

FIG. 4A is a downhole tool 400 for a borehole (e.g., wellbore 306 of FIG. 3). The downhole tool 400 includes a seal stack 402 on a mandrel 404 (tool mandrel). The downhole tool 400 may be, for instance, a packer (e.g., production packer, isolation packer, etc.) to be installed in the wellbore.

The seal stack 402 includes a sealing element having the dual layer elastomer design as discussed. A seal stack generally has multiple seals with different respective materials to give different properties. In application, the seal stack 402 provides for a fluid seal in the wellbore between the seal stack 402 and the wellbore wall, thereby isolating (e.g., the annulus) downhole of the downhole tool 400 from uphole of the downhole tool 400.

Figure 4B:
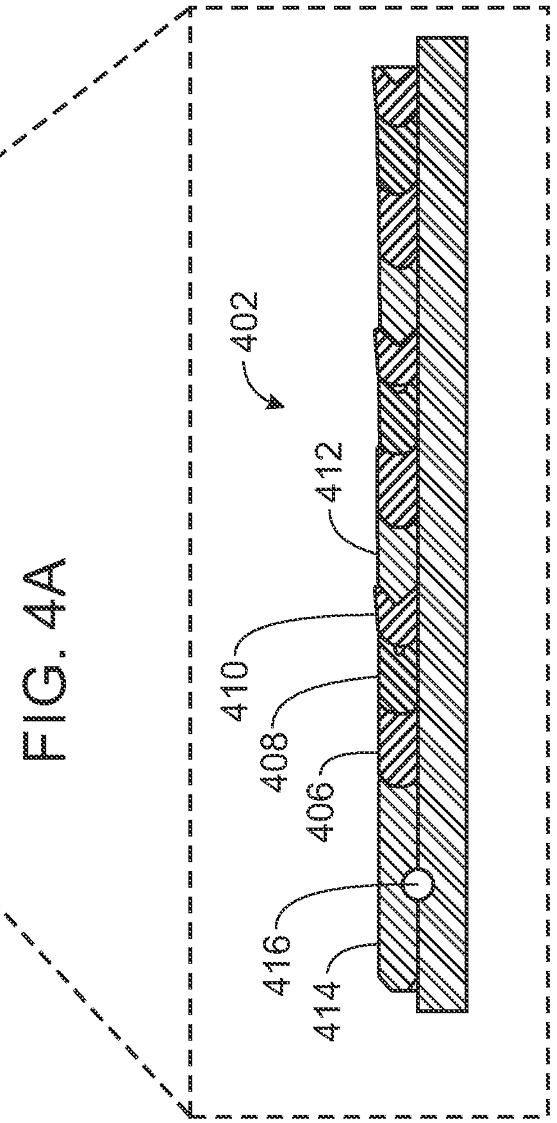
FIG. 4B is a diagram of a seal stack of the downhole tool of FIG. 4A.

FIG. 4B is the seal stack 402 on the mandrel 404. FIG. 4B is an exploded view of the noted portion of FIG. 4A. The seal stack 402 includes seals 406, 408, 410 (e.g., rings) and spacer 412 (e.g., ring). The seals 406, 408, 410 (e.g., elastomeric) may be sealing elements that provide for a fluid seal in the wellbore between the mandrel 404 and the wellbore wall (e.g., casing). At least one of the seals 406, 408, 410 can be the aforementioned dual layer. The seal stack 402 includes an end portion 414 and an O-ring 416. In implementations, the O-ring 416 has the discussed dual layer construction of two different respective elastomers.

Figure 5:
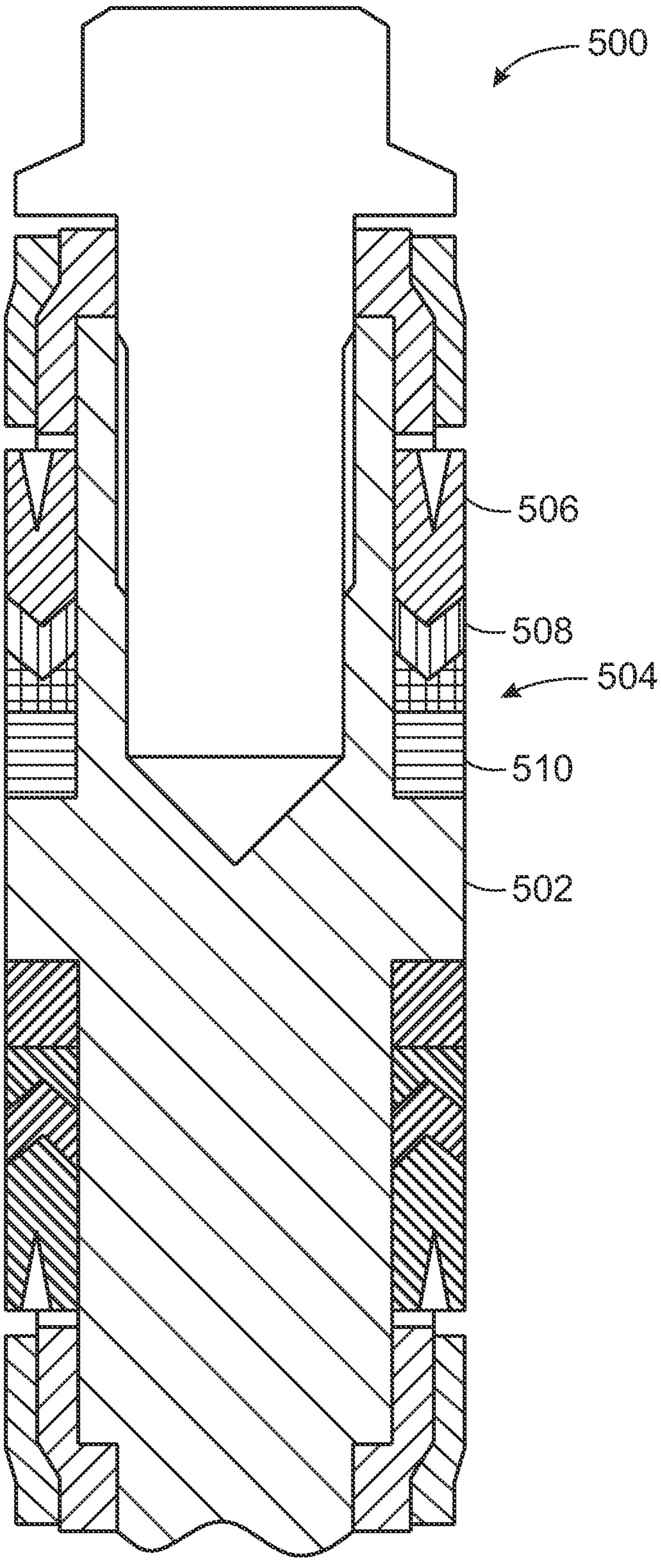
FIG. 5 is a diagram of a downhole tool to be disposed in a borehole.

FIG. 5 is a downhole tool 500 to be disposed in a borehole (e.g., wellbore 306 of FIG. 3). The downhole tool 500 (e.g., packer) as installed in the wellbore may be permanently set or retrievable, mechanically set, hydraulically set, and/or combinations thereof. A retrievable packer may be a type of packer that is run and retrieved on a running string or production string, unlike a permanent production packer that is set in the casing or liner before the production string is run.

As discussed, a packer may be a device that can be run into a wellbore with a smaller initial outside diameter that then expands externally to seal the wellbore. Packers may employ flexible, elastomeric elements that expand, which can be dual layer as presently disclosed. A packer may be a production packer, test packer, isolation packer, etc. A production packer may isolate the annulus (e.g., between the production tubing and the wellbore wall) and anchor or secure the bottom of the production tubing string. A typical packer assembly incorporates a means of securing the packer against the casing or liner wall, such as a slip arrangement, and a means (e.g., sealing elements) of creating a reliable hydraulic seal to isolate the annulus, typically by means of an expandable elastomeric element. Packers are typically classified by application, setting method and possible retrievability.

The downhole tool 500 (e.g., packer) may include a mandrel 502 (tool mandrel) and a seal stack 504 disposed about the mandrel 502. The seal stack 504 may be an assembly of individual sealing elements 506, 508, 510 utilized to seal off a portion of wellbore. One or more of the sealing elements 506, 508, 510 may be the two-elastomer configuration having a first elastomer as an inner core and a second elastomer as a protective outer layer.

As in the illustrated implementation, the individual sealing elements 506, 508, 510, within seal stack 504 may be of differing size, height, and/or shape. Without limitation, a shape may include, for example, cross-sectional shapes that are circular, elliptical, triangular, rectangular, square, hexagonal, irregular, and/or combinations thereof. The material selection for the sealing elements may be to tailor properties of the sealing elements 506, 508, 510, such as hardness, elasticity, gas resistance, chemical resistance, temperature resistance, and high temperature strength, among others.

Figure 6:
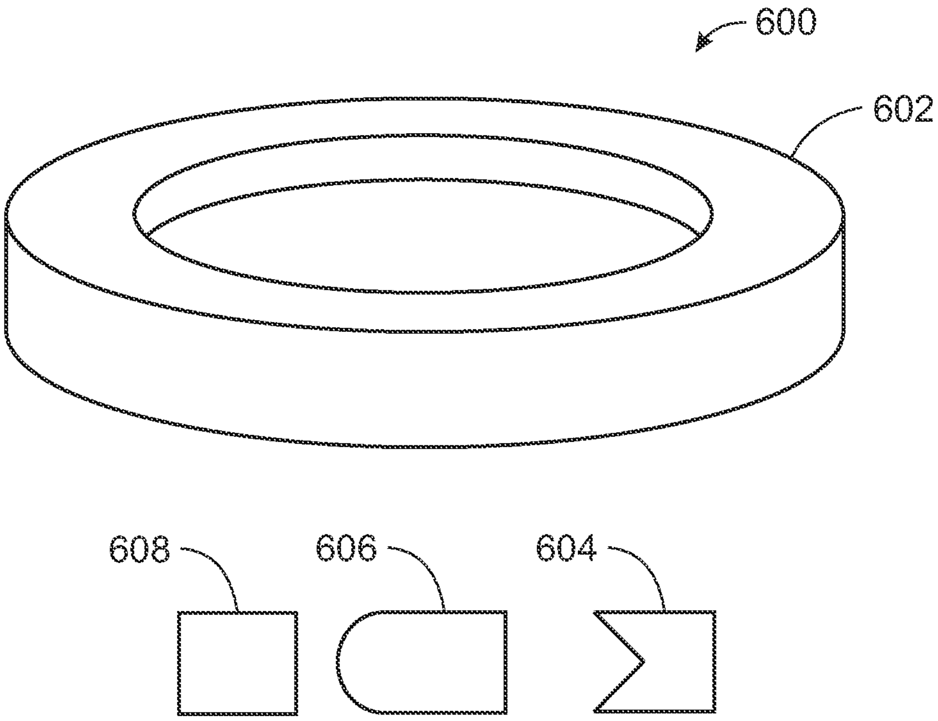
FIG. 6 is a diagram of seal or sealing element that can have the present dual elastomer setup with a first-elastomer inner core and a protective second-elastomer outer layer.

FIG. 6 is a seal or sealing element 600 that can have the present dual elastomer setup with a first-elastomer inner core and a protective second-elastomer outer layer. The sealing element 600 is for a downhole tool, such as packer, plug, liner hanger, etc. As depicted, the sealing element 600 may have a generally annular body 602 (e.g., ring-shaped, comprising a ring shape to be situated around a tool mandrel). In some embodiments, the annular body 602 may be circular and/or hollow. In examples, the sealing element 600 may be configured with cross-sectional shapes. For instance, the sealing element 600 may have a cross-section similar in shape to V-shape 604, D-shape 606, square 608, an irregular shape, and/or combinations thereof.

Figure 7:
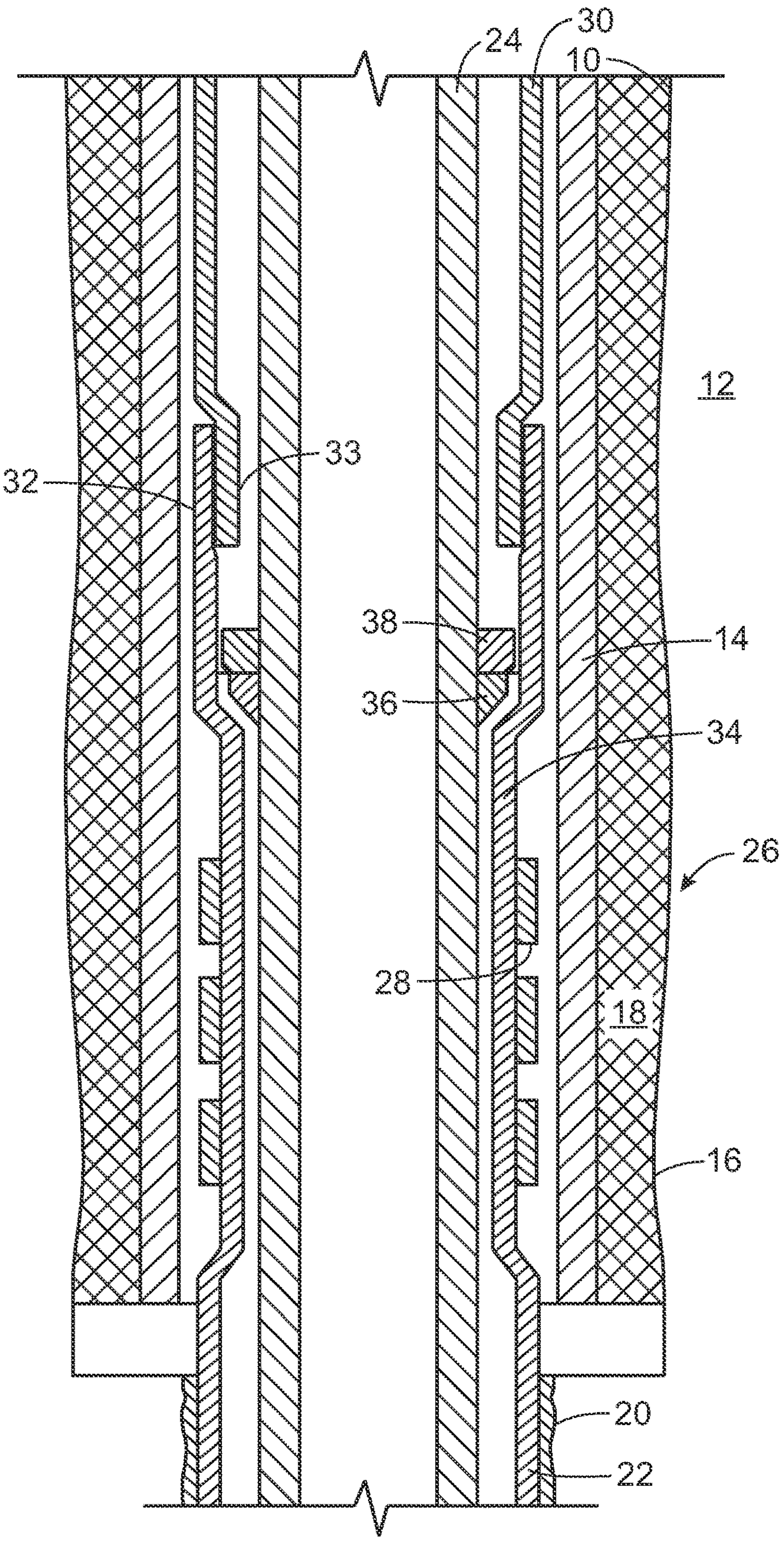
FIG. 7 is a diagram of an expandable liner hanger (ELH) that can incorporate seals (sealing elements) fabricated in a dual elastomer configuration.

FIG. 7 depicts an expandable liner hanger (ELH) that can incorporate seals (sealing elements) fabricated in a dual elastomer configuration, as discussed herein. An ELH can be characterized as a downhole tool in being a cementing tool. Cement may be employed (injected) to install (secure) casing in a wellbore and prevent migration of fluids in the annulus between the casing and the wellbore wall.

ELHs typically utilize elastomeric rings (e.g., rings made of rubber) as seals or sealing elements carried on a section of expandable tubing to provide both mechanical support and a fluid seal. Here, at least one elastomeric ring can be the dual elastomer design.

Once an ELH is placed at a desired position downhole within a wellbore casing, an expansion cone may be forced through the ELH. The expansion cone expands the elastomeric rings of the ELH, bringing the rings (seals) into contact with the casing to provide both mechanical support and a fluid seal between the casing and a liner.

As shown in FIG. 7, a borehole as wellbore 10 may be drilled through the Earth surface into a subterranean formation in the Earth crust. A casing 14 may be placed in an upper portion 16 of the wellbore 10 and held in place by cement 18 that is injected between the casing 14 and the upper portion 16 of wellbore 10 wall (formation 12 face in this example). Once the casing 14 is installed, the casing 14 can be considered the wellbore 10 wall of the upper portion 16. With the casing 14 installed, the upper portion 16 may be called a cased borehole or cased wellbore. The inner (inside diameter) surface of the casing 14 may be considered the inner surface (inside diameter) of the wellbore 10 in the upper portion 16.

Below the casing 14, a borehole as a lower portion 20 of the wellbore 10 may be drilled through casing 14. The lower portion 20 may have a smaller diameter than the upper portion 16. A length of liner 22 is shown positioned within the lower portion 20. The liner 22 may line or case the lower portion 20 and/or be utilized to drill the lower portion 20. If desired, cement 18 may be placed between the liner 22 and the lower portion 20 of wellbore 10. The cement 18 may be placed between the liner 22 and the wellbore 10 wall or formation 12 face of the wellbore 10. The liner 22 may be installed in the wellbore 10 via (by means of) a work string 24. The work string 24 may include a releasable collet (not shown) by which the work string 24 can support and rotate the liner 22 as it is placed in the wellbore 10.

Attached to the upper end of (or formed as an integral part of) the liner 22 is a liner hanger 26 which may include a number of annular seals 28 (sealing elements). One or more of the seals 28 may have the dual elastomer construction.

In operation, the seals 28 may form a seal with the inside surface of the casing 14 as an adjacent surface. While three seals 28 are depicted for illustrative purposes, any number of seals 28 may be used. A polished bore receptacle 30 (or tie back receptacle) may be coupled to the upper end of the liner hanger 26. In one embodiment, the polished bore receptacle 30 may be coupled to the liner hanger 26 by a threaded joint 32, but in other embodiments a different coupling mechanism may be employed. The inner bore of the polished bore receptacle 30 may be smooth and machined to close tolerance to permit work strings, production tubing, etc. to be connected to the liner 22 in a fluid-tight and pressure-tight manner. For instance, a work string may be connected by means of the polished bore receptacle 30 and used to pump fracturing fluid at high pressure down to the lower portion 20 of the wellbore 10 without exposing the casing 14 to the fracturing pressure.

It may be desirable that the outer diameter of liner 22 be as large as possible while being able to lower the liner 22 through the casing 14. It may also desirable that the outer diameter of the polished bore receptacle 30 and the liner hanger 26 be about the same as the diameter of liner 22. In the run in condition, the outer diameter of liner hanger 26 is defined by the outer diameter of the annular seals 28. In the run in condition, a body or mandrel 34 of liner hanger 26 has an outer diameter reduced by about the thickness of the seals 28 so that the outer diameter of the seals is about the same as the outer diameter of liner 22 and tie back receptacle 30.

In this implementation, first and second expansion cones 36 and 38 may be carried on the work string 24 just above the reduced diameter body 34 of the liner hanger 26. Fluid pressure applied between the work string 24 and the liner hanger 26 may be used to drive the cones 36, 38 downward through the liner hanger 26 to expand the body 34 to an outer diameter at which the seals 28 are forced into sealing and supporting contact with the casing 14. The first expansion cone 36 may be a solid, or fixed diameter, cone having a fixed outer diameter smaller than the inner diameter 33 of the threaded joint 32. In the run in condition, second expansion cone 38 may have an outer diameter greater than first cone 36 and also greater than the inner diameter 33 of the threaded joint 32. In an embodiment, the second expansion cone 38 may be collapsible, that is, may be reduced in diameter smaller than the inner diameter 33 of the threaded joint 32 when it needs to be withdrawn from the liner hanger 26. In some contexts, the second expansion cone 38 may be referred to as a collapsible expansion cone. After the liner hanger 26 is expanded, expansion cones 36, 38 may be withdrawn from the liner hanger 26, through the polished bore receptacle 30 and out of the wellbore 10 with the work string 24.

Figure 8:
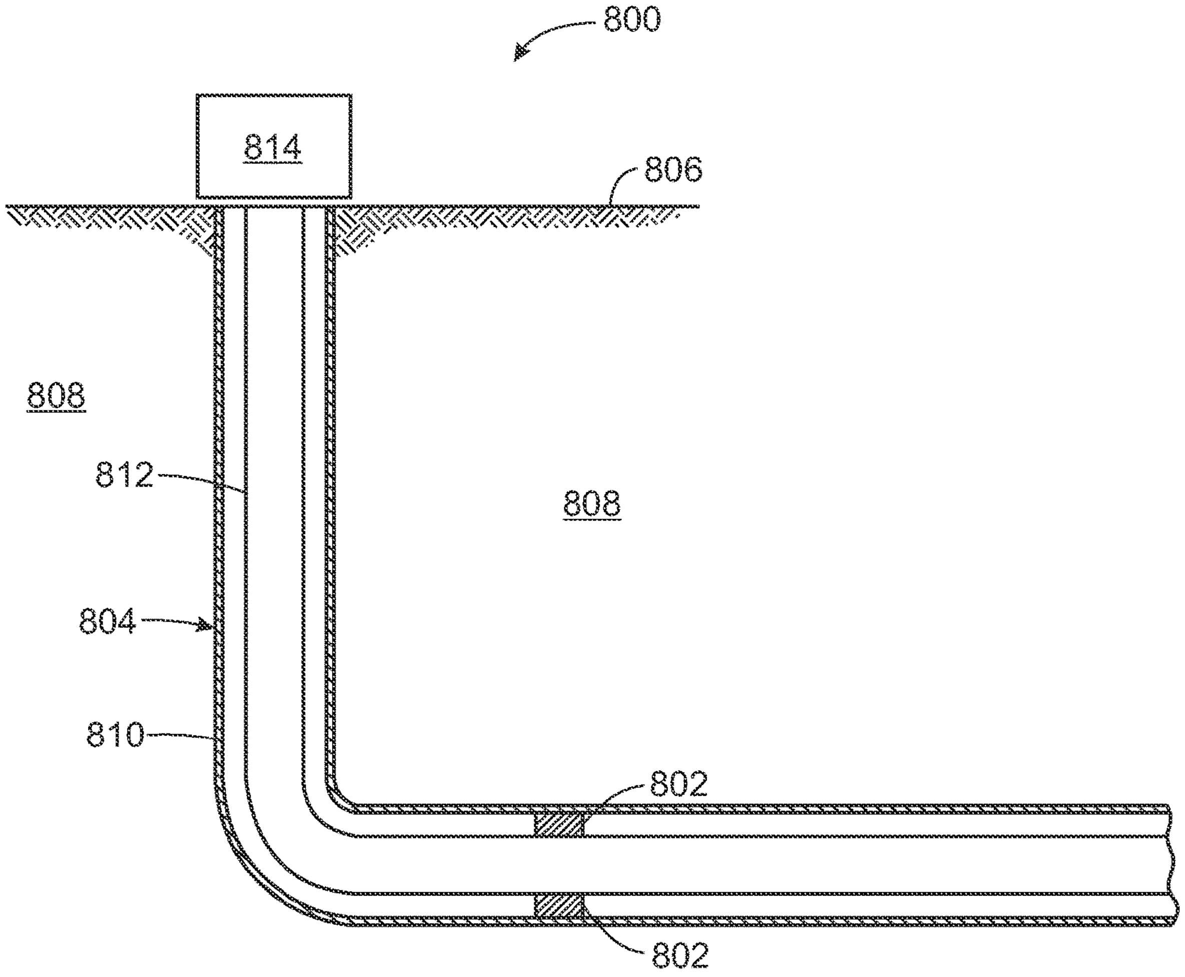
FIG. 8 is a diagram of a well site that includes a packer in a wellbore.

FIG. 8 is a well site 800 that includes a packer 802 in a wellbore 804. The packer 802 has a seal (sealing element) that is the dual elastomer design, as discussed. Depending on the type of packer 802, the packer 802 may be permanently set or retrievable, mechanically set, hydraulically set, and/or combinations thereof. The packer 802 may include one or more sealing elements, such as sealing element 102 of FIGS. 1A-1B, seals 406, 408, 410 of FIG. 4B, and sealing elements 506, 508, 510 of FIG. 5, etc.). The packer 802 may be set downhole to seal off a portion of the wellbore 804.

The wellbore 804 is formed through the Earth surface 806 into a subterranean formation 808. In the illustrated implementation, the wellbore 804 has a casing 810 and is therefore a cased wellbore. In operation, fluid (e.g., hydrocarbon, water, etc.) may be produced from the subterranean formation 808 through the wellbore 804 as produced fluid through production tubing 812 to the surface 806. The surface equipment 814 (e.g., analogous to surface equipment 314 of FIG. 3) may include a wellhead for receipt of the produced fluid. The production tubing 812 may be a tubing string utilized in the production of hydrocarbons. The packer 802 may be disposed on or near production tubing 812. When set, the packer 802 may isolate zones of the annulus between casing 810 and the production tubing 812 (e.g., a tubing string) by providing a seal (fluid seal) between the production tubing 812 and the casing 810. While FIG. 8 depicts use of the packer 802 in a cased portion of the wellbore 804, a packer 802 may also be used in uncased portions (e.g., openhole portions) of a wellbore 804.

As mentioned, along with chemical compatibility or chemical resistance, embodiments discussed herein can include a seal with the outer layer resistant to high temperature, an outer layer having a relatively low Tg that can increase low temperature sealing performance, and/or an outer layer resistant to fluid (gas and/or liquid) diffusion.

In view of the foregoing, the present disclosure may provide a downhole tool having an elastomeric component such as a chemical resistant elastomeric seal comprising two co-cured elastomers. The methods, systems, and tools may include any of the various features disclosed herein, including one or more of the following statements.

Statement 1. An apparatus comprising a downhole tool for a wellbore, the downhole tool having an elastomeric component comprising: an inside portion comprising a first elastomer; and an outside portion comprising a second elastomer different than the first elastomer, wherein the outside portion encloses the inside portion, and wherein the second elastomer is more chemically resistant than the first elastomer to fluids in the wellbore.

Statement 2. The apparatus of Statement 1, wherein the elastomeric component comprises more of the first elastomer than the second elastomer, and wherein the inside portion comprises filler material comprising particles or fibers, or both, that reinforces the first elastomer.

Statement 3. The apparatus of Statement 1 or 2, wherein the outside portion comprises a thickness of at least 0.5 millimeter (mm), and wherein the outside portion comprises filler material comprising particles or fibers, or both, that reinforces the second elastomer.

Statement 4. The apparatus of any preceding Statement, wherein the elastomeric component comprises a sealing element.

Statement 5. The apparatus of any preceding Statement, wherein the elastomeric component comprises an O-ring or a molded seal.

Statement 6. The apparatus of any preceding Statement, wherein the downhole tool comprises a packer, a plug, or a liner hanger.

Statement 7. The apparatus of any preceding Statement, wherein the first elastomer comprises nitrile butadiene rubber (NBR), hydrogenated nitrile butadiene rubber (HNBR), fluorine kautschuk material (FKM), tetrafluoroethylene propylene (FEPM), or epichlorohydrin rubber (ECO).

Statement 8. The apparatus of any preceding Statement, wherein the second elastomer comprises NBR, HNBR, FKM, FEPM, or perfluoroelastomer (FFKM).

Statement 9. An apparatus comprising a downhole tool for a wellbore, the wellbore configured to produce hydrocarbon, and the downhole tool having an elastomeric component comprising: an inside core enclosed by an outside cover, wherein the inside core comprises a first elastomer; and the outside cover comprising a second elastomer different than the first elastomer, wherein the second elastomer is more chemically resistant to fluids in the wellbore than is the first elastomer, and wherein elastomeric component comprises more of the first elastomer than the second elastomer.

Statement 10. The apparatus of Statement 9, wherein the inside core comprises filler material comprising particles or fibers, or both, in the first elastomer, wherein the outer cover comprises filler material comprising particles or fibers, or both, in the second elastomer, and wherein the outside cover comprises a thickness of at least 0.5 millimeter (mm).

Statement 11. The apparatus of Statement 9 or 10, wherein the elastomeric component comprises a sealing element or an O-ring.

Statement 12. The apparatus of any one of Statement 9-11, wherein the downhole tool comprises a packer, a plug, or a liner hanger.

Statement 13. A method of deploying a downhole tool into a wellbore, comprising lowering the downhole tool into the wellbore and positioning the downhole tool at a target location in the wellbore, the downhole tool having an elastomeric component comprising: an inside core comprising a first elastomer; and an outside layer comprising a second elastomer different than the first elastomer, wherein the outside layer encloses the inside core, wherein the second elastomer is more chemically resistant than the first elastomer to fluids in the wellbore, and wherein the elastomeric component comprises more of the first elastomer than the second elastomer.

Statement 14. The method of Statement 13, wherein the second elastomer comprises a thickness of at least 0.5 millimeter (mm).

Statement 15. The method of Statement 13 or 14, wherein the inside portion comprises filler material in the first elastomer, wherein the first elastomer comprises nitrile butadiene rubber (NBR), hydrogenated nitrile butadiene rubber (HNBR), fluorine kautschuk material (FKM), tetrafluoroethylene propylene (FEPM), or epichlorohydrin rubber (ECO).

Statement 16. The method of Statement 13 or 14, wherein the outside portion comprises filler material in the second elastomer, and wherein the second elastomer comprises NBR, HNBR, FKM, FEPM, or perfluoroelastomer (FFKM).

Statement 17. The method of any one of Statements 13-16, wherein the downhole tool comprises a packer, a plug, or a liner hanger.

Statement 18. The method of any one of Statements 13-17, wherein the elastomeric component is an O-ring or a molded seal.

Statement 19. The method of Statements 13-17, comprising forming, via the sealing element, a seal between the downhole tool and a surface in the wellbore, wherein the elastomeric component is the sealing element.

Statement 20. The method of Statements 13-17, comprising forming, via the sealing element, a seal between the downhole tool and a wall of the wellbore, wherein the elastomeric component is the sealing element.

The present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. An apparatus comprising:

a downhole tool for a wellbore, the downhole tool having an elastomeric component comprising:

an inside portion comprising a first elastomer; and an outside portion comprising a second elastomer different than the first elastomer, wherein the outside portion completely encloses the inside portion, wherein the inside portion comprising the first elastomer and the outside portion comprising the second elastomer are co-cured elastomers, wherein the elastomeric component comprises more of the first elastomer than the second elastomer, wherein the outside portion comprises a thickness of at least 0.5 millimeter (mm), and wherein the second elastomer is more resistant than the first elastomer to chemical corrosion by fluids in the wellbore.

2. The apparatus of claim 1, wherein the second elastomer has a greater resistance to gas diffusion than the first elastomer, and wherein the inside portion comprises filler material comprising particles or fibers, or both, that reinforces the first elastomer.

3. The apparatus of claim 1, wherein the second elastomer encapsulates the first elastomer, and wherein the outside portion comprises filler material comprising particles or fibers, or both, that reinforces the second elastomer.

4. The apparatus of claim 1, wherein the downhole tool comprises a packer, a plug, or a liner hanger, wherein the inside portion comprising the first elastomer and the outside portion comprising the second elastomer are co-extruded layers, wherein the elastomeric component comprises a sealing element, and wherein the second elastomer has a greater resistance than the first elastomer to diffusion and swelling by the fluids.

5. The apparatus of claim 1, wherein the elastomeric component comprises an O-ring.

6. The apparatus of claim 1, wherein the inside portion comprising the first elastomer and the outside portion comprising the second elastomer are co-extruded layers, or wherein the outside portion comprising the first elastomer is wrapped around the inside portion comprising the second elastomer.

7. The apparatus of claim 1, wherein the first elastomer and the second elastomer are bonded together, wherein the first elastomer comprises fluorine kautschuk material (FKM), tetrafluoroethylene propylene (FEPM), or epichlorohydrin rubber (ECO).

8. The apparatus of claim 1, wherein the second elastomer comprises FKM, FEPM, or perfluoroelastomer (FFKM).

9. An apparatus comprising:

a downhole tool for a wellbore, the wellbore configured to produce hydrocarbon, and the downhole tool having an elastomeric component comprising:

an inside core completely enclosed by an outside cover, wherein the inside core comprises a first elastomer; and the outside cover comprising a second elastomer different than the first elastomer, wherein the inside core comprising the first elastomer and the outside cover comprising the second elastomer are co-cured elastomers, wherein the outside cover comprises a thickness of at least 0.5 millimeter (mm), wherein the second elastomer is more resistant than the first elastomer to chemical corrosion by fluids in the wellbore, and wherein the elastomeric component comprises more of the first elastomer than the second elastomer.

10. The apparatus of claim 9, wherein the inside core comprises filler material comprising particles or fibers, or both, in the first elastomer, and/or wherein the outer cover comprises filler material comprising particles or fibers, or both, in the second elastomer.

11. The apparatus of claim 9, wherein the inside core comprising the first elastomer and the outside cover comprising the second elastomer are co-extruded elastomers, or wherein the outside cover comprising the second elastomer is wrapped around the inside core comprising the first elastomer.

12. The apparatus of claim 9, wherein the downhole tool comprises a packer, a plug, or a liner hanger, and wherein the first elastomer and the second elastomer are bonded together.

13. A method of deploying a downhole tool into a wellbore, comprising:

lowering the downhole tool into the wellbore, the downhole tool having an elastomeric component comprising:

an inside core comprising a first elastomer; and an outside layer comprising a second elastomer different than the first elastomer, wherein the first elastomer and the second elastomer are co-cured elastomers, wherein the outside layer fully encloses the inside core, wherein the second elastomer comprises a thickness of at least 0.5 millimeter (mm), wherein the second elastomer is more resistant than the first elastomer to chemical corrosion by fluids in the wellbore, and wherein the elastomeric component comprises more of the first elastomer than the second elastomer; and positioning the downhole tool at a target location in the wellbore.

14. The method of claim 13, wherein the downhole tool comprises a packer, a plug, or a liner hanger, wherein the outside layer is fabricated or applied through co-extrusion with the inside core, and wherein the second elastomer has a greater resistance to gas diffusion than the first elastomer.

15. The method of claim 13, wherein the inside core comprises filler material in the first elastomer, and wherein the first elastomer comprises fluorine kautschuk material (FKM), tetrafluoroethylene propylene (FEPM), or epichlorohydrin rubber (ECO).

16. The method of claim 13, wherein the first elastomer and the second elastomer are bonded together, wherein the outside layer comprises filler material in the second elastomer, and wherein the second elastomer comprises FKM, FEPM, or perfluoroelastomer (FFKM).

17. The method of claim 13, wherein the outside layer is wrapped around the inside core, or wherein the outside layer and the inside core are co-extruded layers.

18. The method of claim 13, wherein the elastomeric component is an O-ring.

19. The method of claim 13, comprising forming, via the elastomeric component, a seal between the downhole tool and a surface in the wellbore, wherein the elastomeric component is a sealing element, and wherein the outside layer is fabricated through co-extrusion with the inside core or the outside layer is applied by wrapping the outside layer around the inside core.

20. The method of claim 13, comprising forming, via the elastomeric component, a seal between the downhole tool and a wall of the wellbore, wherein the elastomeric component is a sealing element, wherein the first elastomer comprises NBR or FKM rubber, wherein the second elastomer comprises FEPM or FFKM, and wherein the second elastomer has a greater resistance than the first elastomer to diffusion and swelling by the fluids.

* * * * *